US009497164B2

(12) United States Patent
Harp et al.

(10) Patent No.: US 9,497,164 B2
(45) Date of Patent: Nov. 15, 2016

(54) SYSTEM AND METHOD OF REDIRECTING INTERNET PROTOCOL TRAFFIC FOR NETWORK BASED PARENTAL CONTROLS

(75) Inventors: David Harp, Plano, TX (US); Toby Bearden, McKinney, TX (US); Jason M. Godfrey, Volcano, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 613 days.

(21) Appl. No.: 12/789,001

(22) Filed: May 27, 2010

(65) Prior Publication Data

US 2011/0292938 A1 Dec. 1, 2011

(51) Int. Cl.
*H04L 29/06* (2006.01)
*G06F 17/30* (2006.01)
*H04L 29/12* (2006.01)
*H04L 12/725* (2013.01)

(52) U.S. Cl.
CPC ..... *H04L 63/0245* (2013.01); *G06F 17/30867* (2013.01); *H04L 29/12283* (2013.01); *H04L 45/306* (2013.01); *H04L 61/2015* (2013.01); *H04L 61/2061* (2013.01); *H04L 63/168* (2013.01)

(58) Field of Classification Search
None
See application file for complete search history.

(56) References Cited

U.S. PATENT DOCUMENTS

| | | | | |
|---|---|---|---|---|
| 6,781,608 | B1* | 8/2004 | Crawford | 715/758 |
| 7,051,116 | B1 | 5/2006 | Rodriguez-Val et al. | |
| 7,484,005 | B2 | 1/2009 | Rodriguez-Val et al. | |
| 7,571,229 | B2 | 8/2009 | Reasor et al. | |
| 7,600,019 | B2 | 10/2009 | Reasor et al. | |
| 7,895,335 | B2* | 2/2011 | Watson, Jr. | 709/227 |
| 8,798,057 | B1* | 8/2014 | Goel | H04L 45/302 370/392 |
| 2002/0023160 | A1* | 2/2002 | Garrett | H04L 12/2801 709/229 |
| 2002/0026503 | A1* | 2/2002 | Bendinelli | H04L 12/2602 709/220 |
| 2003/0191801 | A1* | 10/2003 | Paul | H04L 29/06 709/203 |
| 2004/0003071 | A1* | 1/2004 | Mathew et al. | 709/223 |
| 2004/0034695 | A1* | 2/2004 | Touch | H04L 29/12283 709/209 |
| 2004/0043817 | A1* | 3/2004 | Willis | A63F 13/12 463/42 |
| 2004/0172557 | A1* | 9/2004 | Nakae et al. | 713/201 |
| 2005/0080864 | A1* | 4/2005 | Daniell | 709/206 |
| 2005/0100027 | A1* | 5/2005 | Leinwand | H04L 29/12009 370/400 |
| 2005/0144297 | A1 | 6/2005 | Dahlstrom et al. | |
| 2005/0177562 | A1* | 8/2005 | Raciborski | 707/3 |
| 2005/0198319 | A1 | 9/2005 | Chan et al. | |
| 2005/0259654 | A1* | 11/2005 | Faulk, Jr. | 370/392 |
| 2006/0037072 | A1* | 2/2006 | Rao | H04L 1/1854 726/14 |
| 2006/0165053 | A1* | 7/2006 | Bhatnagar | H04L 67/02 370/351 |
| 2006/0253417 | A1* | 11/2006 | Brownrigg et al. | 707/1 |

(Continued)

*Primary Examiner* — Marsha D. Banks Harold
*Assistant Examiner* — Christopher Wyllie
(74) *Attorney, Agent, or Firm* — Guntin & Gust, PLC; Jay H. Anderson

(57) ABSTRACT

A method of redirecting traffic on a network includes receiving a subscriber request to use a parental control service, assigning to the subscriber's access device an Internet protocol (IP) address from a block of addresses reserved for the service, receiving a transaction, determining that the transaction is from an address in the block, and redirecting the transaction to a parental control device on the network. A network-based parental control system includes an access device for an account that uses a parental control service, a dynamic host configuration protocol server that assigns to the access device an IP address from a block of addresses reserved for the parental control service, a parental control policy device, and a router that receives a transaction from the access device, determines that the transaction is from an address in the block, and redirects the transaction to the parental control policy device.

20 Claims, 4 Drawing Sheets

(56) References Cited

U.S. PATENT DOCUMENTS

| | | | |
|---|---|---|---|
| 2008/0005285 A1* | 1/2008 | Robinson | H04L 41/0893 709/220 |
| 2008/0066161 A1* | 3/2008 | Ohhira | H04L 29/12801 726/4 |
| 2010/0050270 A1 | 2/2010 | Pratt et al. | |
| 2010/0293597 A1* | 11/2010 | Hayashi | 726/3 |
| 2011/0035799 A1* | 2/2011 | Handler | 726/21 |
| 2011/0055862 A1* | 3/2011 | Harp | H04N 7/17318 725/25 |
| 2011/0088074 A1* | 4/2011 | Harp | H04N 21/43615 725/110 |
| 2011/0208801 A1* | 8/2011 | Thorkelsson et al. | 709/203 |
| 2011/0292938 A1* | 12/2011 | Harp | G06F 17/30867 370/392 |
| 2011/0314177 A1* | 12/2011 | Harp | H04L 63/306 709/238 |
| 2012/0023562 A1* | 1/2012 | Harp | H04L 63/102 726/7 |
| 2013/0283359 A1* | 10/2013 | Lu | H04L 63/105 726/5 |

* cited by examiner

SYSTEM AND METHOD OF REDIRECTING INTERNET PROTOCOL TRAFFIC FOR NETWORK BASED PARENTAL CONTROLS

FIELD OF THE DISCLOSURE

The present disclosure generally relates to a computer network, and more particularly relates to Internet protocol traffic steering for network based parental controls in a computer network.

BACKGROUND

Packet-switched networks, such as networks based on the TCP/IP protocol suite, can provide a rich array of information services to a wide variety of client applications. As the volume of information service requests in a packet-switched network changes, the routing behavior of the access routers in the packet-switched network can be changed to more efficiently handle the service load.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed systems, methods or computer-readable media. Moreover, some statements may apply to some inventive features but not to others.

Figure 1:
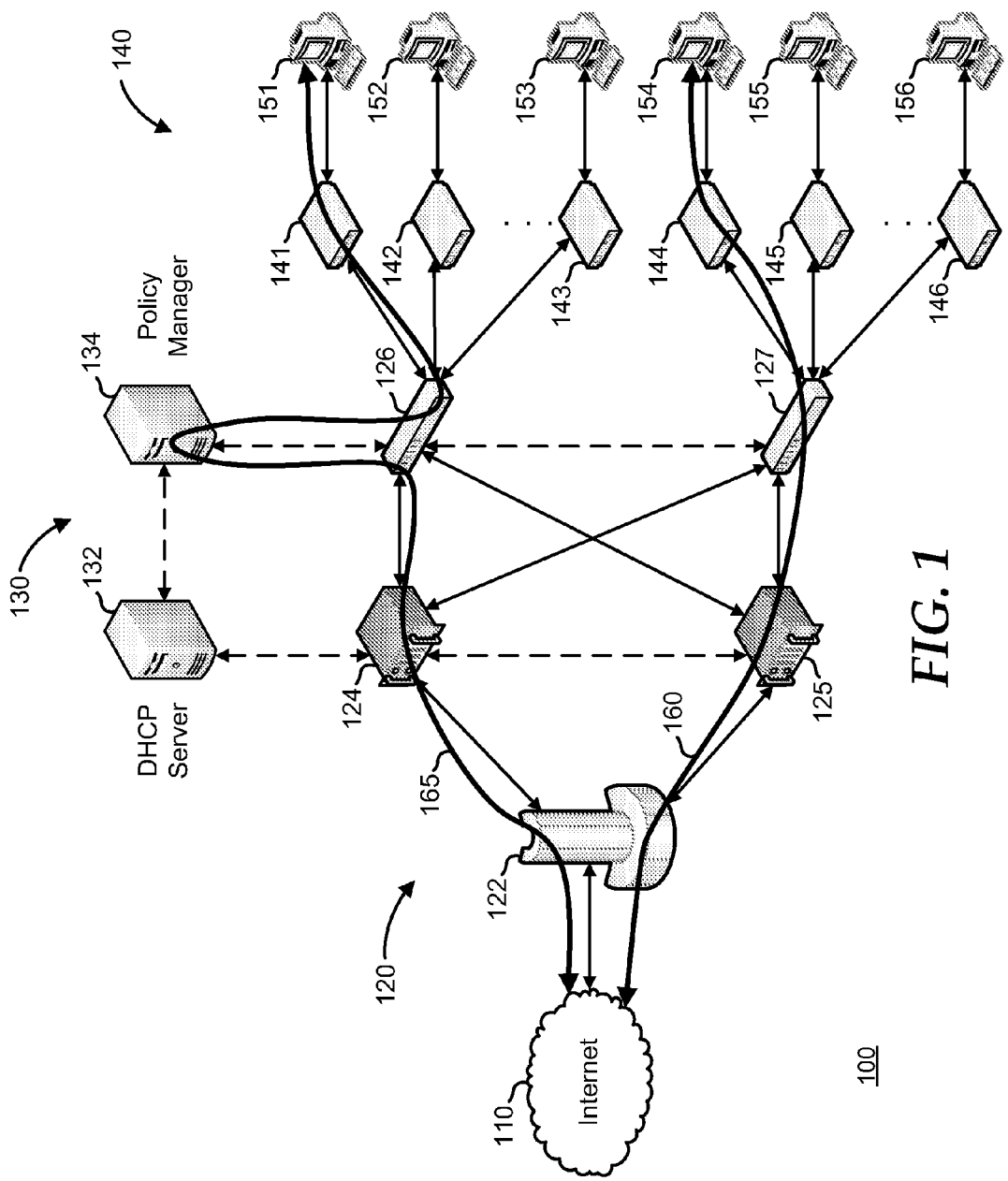
FIG. 1 is a block diagram illustrating an embodiment of a broadband access system.

FIG. 1 shows an embodiment of a broadband access system 100, including a content network 110, a broadband network 120, a support network 130, and subscriber network 140. Content network 110 represents a large area network such as the Internet, or other such public or private networks. Broadband network 120 includes a transport router 122, distribution routers 124 and 125, and access routers 126 and 127. Broadband network 120 can also include additional transport routers, distribution routers, or access routers. Support network 130 includes a dynamic host configuration protocol (DHCP) server 132 and a policy manager 134. Subscriber network 140 includes broadband access devices 141 through 146, and subscriber equipment 151 through 156. In a particular embodiment, broadband access system 100 represents a network operated by an Internet service provider (ISP) (not illustrated). In another embodiment, broadband access system 100 represents a network operated by an Internet protocol television (IPTV) or cable Internet service provider (not illustrated).

In operation, a user (not illustrated) subscribes to a service provided by the operator of broadband access system 100. The user has the ability to use a particular set of subscriber equipment 151 through 156. As such, the user can include a particular subscriber in subscriber network 140, or another individual or entity with access to the user's subscriber equipment 151 through 156. Subscriber equipment 151-156 can include home computing devices such as laptop or desktop computers, gaming consoles, media systems, IPTV enabled devices such as a set-top box, other home computing devices, or a combination thereof. Subscriber equipment 151-156 can also include mobile computing devices such as Internet enabled cellular telephones, tablet devices, e-book readers, other mobile computing devices, or a combination thereof. Subscriber equipment 151-156 can also include enterprise computing devices such as local area or wide area networks, server or storage resources, other enterprise computing devices, or a combination thereof.

Each user's subscriber equipment 151 through 156 is connected to an associated access device 141 through 146 to provide broadband access to the resources of content network 110 and broadband network 120. Access devices 141 through 146 can include broadband modems such as digital subscriber line (DSL) modems, residential gateways in an IPTV network, other broadband access devices, or a combination thereof. In a particular embodiment, access devices 141 through 146 are located on the premises of the associated users. In another embodiment, access devices 141 through 146 are located such that a wireless network is established. For example, access devices 141 through 146 can include a wireless access point that makes up a WiFi network according to the IEEE 802.11 standards, a WiMAX network according to the IEEE 802.16 standards, or another wireless network. Access devices 141 through 146 can be provided by the associated users or by the operator of broadband access system 100.

Access devices 141 through 146 are connected to access routers 126 and 127. Access routers 126 and 127 are connected to one or more distribution routers 124 and 125, which are in turn connected to transport router 122. Broadly, access routers 126 and 127, distribution routers 124 and 125, and transport router 122 represent a broadband network operated by the ISP, and can include various levels of increasing geographic coverage. For example, access routers 126 and 127 can be located so as to provide service to a group of access devices 141 through 146 that are located in a close geographical area. Thus, as illustrated, access devices 141, 142, and 143 are connected to access router 126, and access devices 144, 145, and 146 are connected to access router 127. For example, access routers 126 and 127 can represent digital subscriber line access multiplexers (DSLAMs) that provide broadband access to multiple users that are located within a few meters to up to several kilometers of the DSLAM. Similarly, distribution routers 124 and 125 can represent a central office that provides service to a larger geographical area such as a small town or a neighborhood, and transport router 122 can represent a head end office that provides service to an even larger geographical area such as a region or a metropolitan area. Transport router 122 is connected to content network 110 to provide access to wider resources and services provided in content network 110, including the resources and services of another ISP (not illustrated) serving the same or similar area as broadband access system 100, and the resources and services of the Internet.

Support network 130 functions to provide operational support for broadband network 120 and subscriber network 140. DHCP server 132 functions to automate the assignment of network parameters to access devices 141 through 146. When access devices 141 through 146 connect to broadband network 120, DHCP server 132 provides the access devices with the network parameters used to uniquely identify the access devices on broadband network 120. As such, DHCP server 132 manages a pool of Internet protocol (IP) addresses for assignment to access devices 141 through 146, a subnet mask and default gateway for broadband network 120, and name servers associated with the broadband network. In a particular embodiment, DHCP server 132 allocates a block of IP addresses based upon the location of access routers 126 and 127, and the associated access devices 141-146, as illustrated in Table 1. Thus access devices 141, 142, and 143 that are associated with access router 126 are assigned IP addresses in the range of 123.456.700.XXX, and access devices 144, 145, and 146 that are associated with access router 127 are assigned IP addresses in the range of 123.456.800.XXX.

TABLE 1

IP Address Allocation

| Access Router | IP Address Block | Access Device | IP Address |
|---|---|---|---|
| 126 | 123.456.700.XXX | 141 | 123.456.700.002 |
|  |  | 142 | 123.456.700.004 |
|  |  | 143 | 123.456.700.006 |
| 127 | 123.456.800.XXX | 144 | 123.456.800.002 |
|  |  | 145 | 123.456.800.004 |
|  |  | 146 | 123.456.800.006 |

Policy manager 134 functions to provide specialized services for broadband network 120. For example, policy manager 134 can operate to provide network based security services for subscriber network 120, to provide network data analysis information to the operator of broadband access system 100, or to provide data intercepts in response to lawful requests received from law enforcement officials. In a particular embodiment described below, policy manager 134 provides parental control services for subscriber network 120.

In a particular embodiment, subscriber equipment 151 through 156 include multiple computing devices configured in a private internet (not illustrated), where each computing device is assigned a private IP address that uniquely identifies each computing device within the private internet, but which may not be visible on broadband network 120. Here, access devices 141 through 146 can function as network address translators (NATs) that track transactions from the computing devices with private IP addresses that are targeted to broadband network 120 or to content network 110. When such a transaction is received, access devices 141 through 146 translate the private IP address that is the source of the transaction to an IP address that is recognized on broadband network 120. Typically, the recognized IP address is the IP address that is assigned to the particular access device 141 through 146 that is supplied by DHCP server 132. Access devices 141 through 146 can also add information to the transactions that identify the source of the transactions, so that when a return transaction is received, the access devices can correctly route the return packets to the intended target computing device.

In a particular embodiment, the operator of broadband access system 100 offers services to users of the broadband access system. For example, an IPTV provider or ISP can offer a parental control service that operates on policy manager 134, and that permits subscribers to set content access restrictions for some or all of the users of the subscribers' computing devices. Various parental control schemes may be employed including content filtering, usage control and management, and monitoring. Content filtering includes blocking or limiting access to certain content types, such as permitting only age-appropriate content to younger users within a household. Usage control and management includes placing time limits on the use of a subscriber's computing devices, restricting the use of such devices to certain types of activities, or enforcing use of such devices for other types of activities. For example, a parent may limit the hours of time spent playing on-line games, or ensure that a certain amount of time is spent in educational activities. Monitoring includes tracking the activities of a user on a subscribers computing devices, and providing usage logs to the subscriber.

When particular subscriber equipment 151 through 156 is configured such that multiple computing devices are arranged into a private internet, as described above, the user of the subscriber equipment can apply different parental control settings to each computing device, or to different users. For example, a parent can block adult content from being viewed on a child's laptop computer, or on a commonly used home computer when the child is logged on. Thus multiple parental control settings can be established within the particular subscriber equipment 151 through 156. Within the private internet, parental control can be ensured with reference to the private IP address of the device that issues a transaction. Thus transactions can be scanned to determine the source IP address, and if the source IP address of a particular transaction is subject to parental controls, then the appropriate control activities can be applied to the transaction.

However, where access devices 141 through 146 function as NATs, the source IP address of the transactions can be invisible to policy manager 134. In a particular embodiment (not illustrated), additional information may be supplied with a transaction that indicates that the transaction is subject to parental controls. Here multiple policy managers are co-located with access routers 126 and 127, and transactions are inspected to see if they are subject to parental controls. If so, then the transactions are sent to the local policy manager to apply the correct parental controls to the transactions. In this embodiment, access routers 126 and 127 include logic to not only route transactions based upon the source and destination IP addresses contained in the transactions, but also to inspect the transactions to determine if application of parental controls by the policy mangers is necessary.

This embodiment can result in a processing bottleneck at access routers 126 and 127 because of the need for transaction inspection, and in increased cost and complexity due to the maintenance of multiple policy managers co-located with access routers 126 and 127. Moreover, since the number of users that opt to utilize the parental control service is typically small, the proportion of transactions that are processed by each policy manager to the total number of transactions received by the co-located access routers 126 and 127 is correspondingly small, and a large proportion of the transactions are inspected to no added benefit. Also, note that parental control services can operate not only on outgoing transactions from users who opt to utilize the service, but also on incoming transactions to those users, so access routers 126 and 127 may need to inspect both outgoing and incoming traffic to implement a robust parental control service.

In another embodiment, in addition to allocating blocks of IP addresses based upon the location of access routers 126 and 127, DHCP server 132 allocates an additional block of IP addresses that are associated with users who opt to utilize the parental control service, as illustrated in Table 2. Here, access devices 141 and 145 are assigned IP addresses in the range of 123.456.900.XXX, and not in the ranges otherwise associated with access routers 126 and 127, because the users of the access devices have opted to utilize the parental control service. In this embodiment, access routers 126 and 127 include logic to redirect transactions based upon the source and destination IP addresses contained in the transactions.

TABLE 2

IP Address Allocation (with Parental Control Addresses)

| Access Router | Access Router IP Address Block | Parental Control IP Address Block | Access Device | Parental Control? | IP Address |
|---|---|---|---|---|---|
| 126 | 123.456.700.XXX | 123.456.900.XXX | 141 | Yes | 123.456.900.002 |
|  |  |  | 142 | No | 123.456.700.004 |
|  |  |  | 143 | No | 123.456.700.006 |
| 127 | 123.456.800.XXX | 123.456.900.XXX | 144 | No | 123.456.800.002 |
|  |  |  | 145 | Yes | 123.456.900.004 |
|  |  |  | 146 | No | 123.456.800.006 |

In this embodiment, when access routers 126 and 127 receive transactions with source or destination IP addresses that are within the associated access router IP address block, then the access routers process the transactions in accordance with the routing rules established for broadband access system 100. For example, a transaction 160 is initiated in subscriber equipment 154 that is forwarded to access device 144. Transaction 160 includes a source IP address of 123.456.800.002, which is not within the parental control IP address block, so access router 127 directs transaction 160 through distribution router 125 and transport router 122 to content network 110. Transaction 160 is illustrated as being bidirectional because incoming transactions with a target IP address of 123.456.800.002 will be directed to access device 144 for return to subscriber equipment 154.

When access routers 126 and 127 receive transactions that are within the parental control IP address block, then the access routers redirect the transactions to policy manager 134. For example, a transaction 165 is initiated in subscriber equipment 151 that is forwarded to access device 141. Transaction 165 includes a source IP address of 123.456.900.002, which is within the parental control IP address block, so access router 126 redirects transaction 165 to policy manager 134 for processing. If transaction 165 is a permitted transaction under the user's parental control policy, then policy manager 134 completes the transaction by sending the transaction through access router 126, to distribution router 125 and transport router 122 to content network 110. If transaction 165 is not permitted, then the transaction terminates in policy manager 134. In a particular embodiment (not illustrated), policy manager 134 responds to transaction 165, indicating that the transaction was blocked. Transaction 165 is illustrated as being bidirectional because incoming transactions with a target IP address of 123.456.900.002 will be redirected to policy manager 134 for processing. By rerouting transactions with source or destination IP addresses that are within the parental control IP address block to policy manager 134, the potential for bottleneck in access routers 126 is reduced, the cost and complexity of implementing parental control services is lessened, and the policy manager can be sized and resourced to match the expected traffic from users who opt into the service. Note that, although access routers 126 are described as performing the function of redirecting transactions to policy manager 132, and that the policy manager is described as returning transactions to the access routers, other elements of broadband network 120 can perform the redirection and receive the return transactions as needed or desired.

Figure 2:
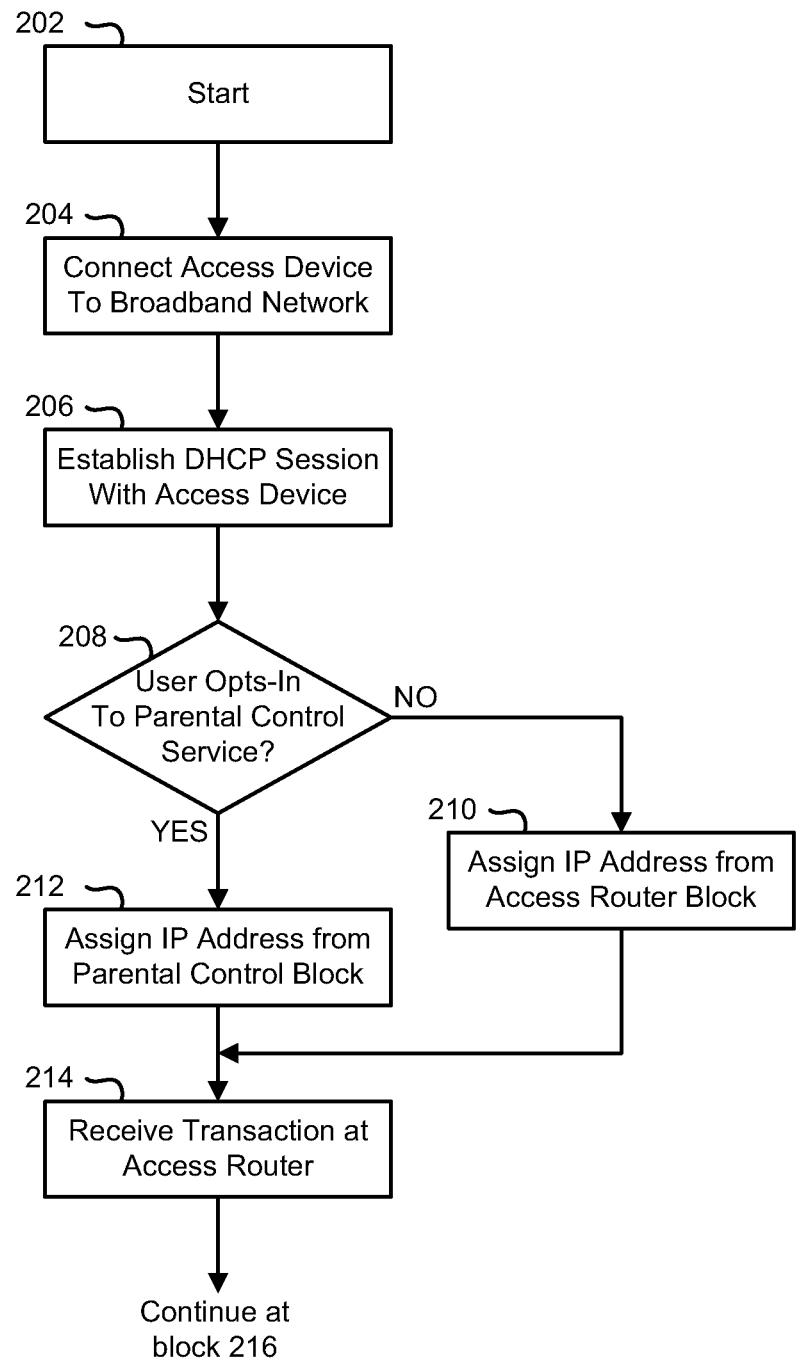
FIGS. 2 and 3 present a flowchart illustrating an embodiment of a method for redirecting Internet protocol traffic for network based parental controls.
Figure 3:
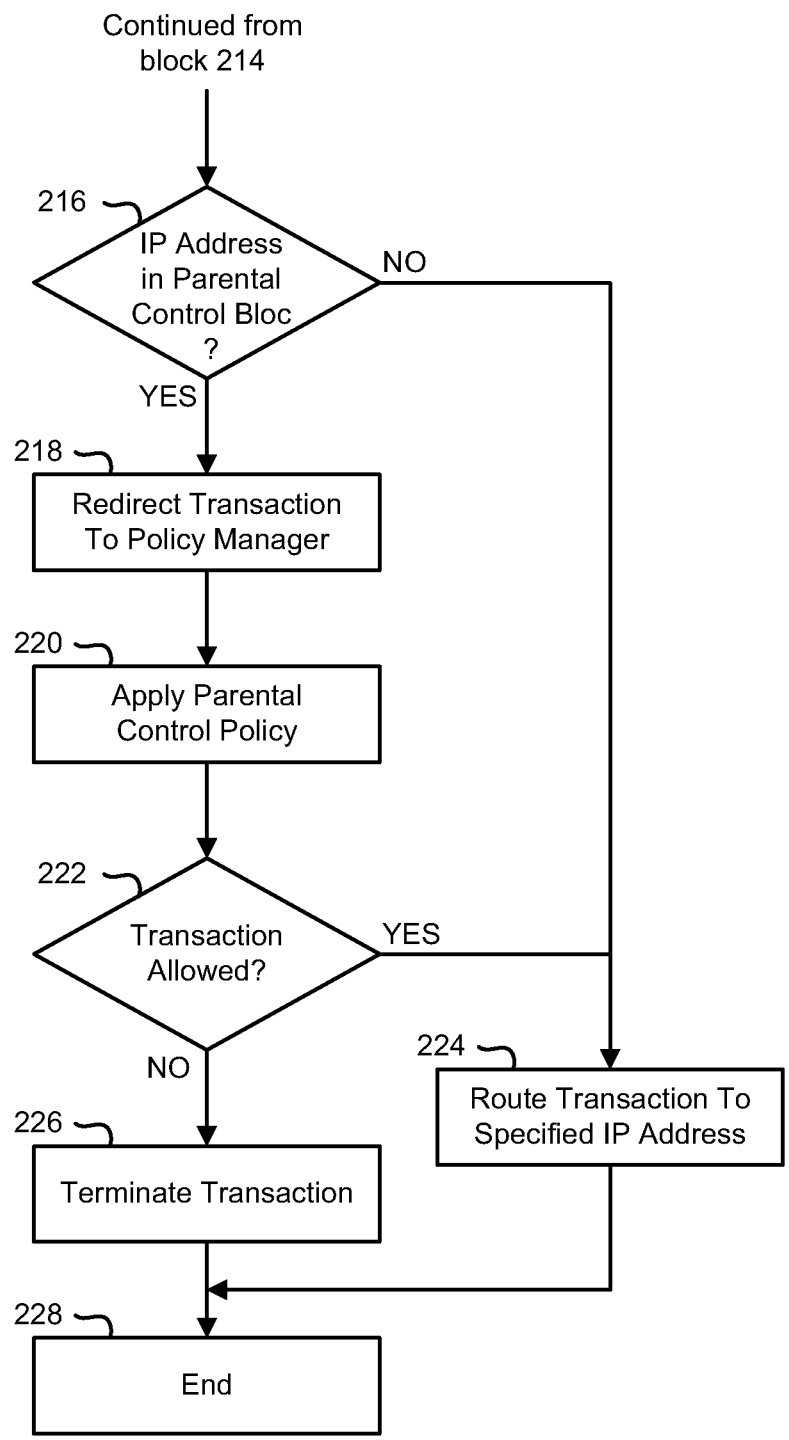

FIGS. 2 and 3 present a flowchart illustrating an embodiment of a method for redirecting of IP traffic for network based parental controls. The method starts in block 202 and an access device is connected to a broadband network in block 204. For example, one of access devices 141 through 146 can be connected to access routers 126 and 127. A DHCP session is established in block 206, such as between an access device and DHCP server 132. A decision is made as to whether or not the user associated with the access device has opted-in to the parental control service in decision block 208. If not, the "NO" branch of decision block 208 is taken, and the access device is assigned an IP address from a block of IP addresses associated with the access router to which the access device is connected in block 210. For example, access device 146 can be assigned an IP address of 123.456.800.006 because it is connected to access router 127. If the user associated with the access device has opted-in to the parental control service, the "YES" branch of decision block 208 is taken, and the access device is assigned an IP address from a block of IP addresses associated with the parental control service in block 212. For example, access device 141 can be assigned an IP address of 123.456.900.002 because it is opted into the parental control service.

A transaction is received by an access router in block 214, and a decision is made as to whether or not a source or destination IP address in the transaction is included in the block of IP addresses associated with the parental control option in decision block 216. If not, the "NO" branch of decision block 216 is taken, the transaction is routed to the specified destination IP address in block 224, and the method ends in block 228. For example, a transaction from access device 144 can be routed to content network 110. If a source or destination IP address in the transaction is included in the block of IP addresses associated with the parental control option, the "YES" branch of decision block 216 is taken, and the transaction is redirected to a policy manager in block 218. For example, a transaction from access device 141 is routed to policy manager 134.

The parental control policy is applied to the transaction in block 220. For example, a filter can be applied to determine if the transaction is permitted, or the transaction can be tracked and logged for reporting to the subscriber. A decision is made as to whether or not the transaction is allowed in decision block 222. If so, the "YES" branch of decision block 222 is taken, the transaction is routed to the specified destination IP address in block 224, and the method ends in block 228. If the transaction is not allowed, the "NO" branch of decision block 222 is taken, the transaction is terminated in block 226, and the method ends in block 228. In a particular embodiment (not illustrated) when the transaction is terminated in block 226, a transaction is issued to the access device to indicate that the transaction has been blocked.

Figure 4:
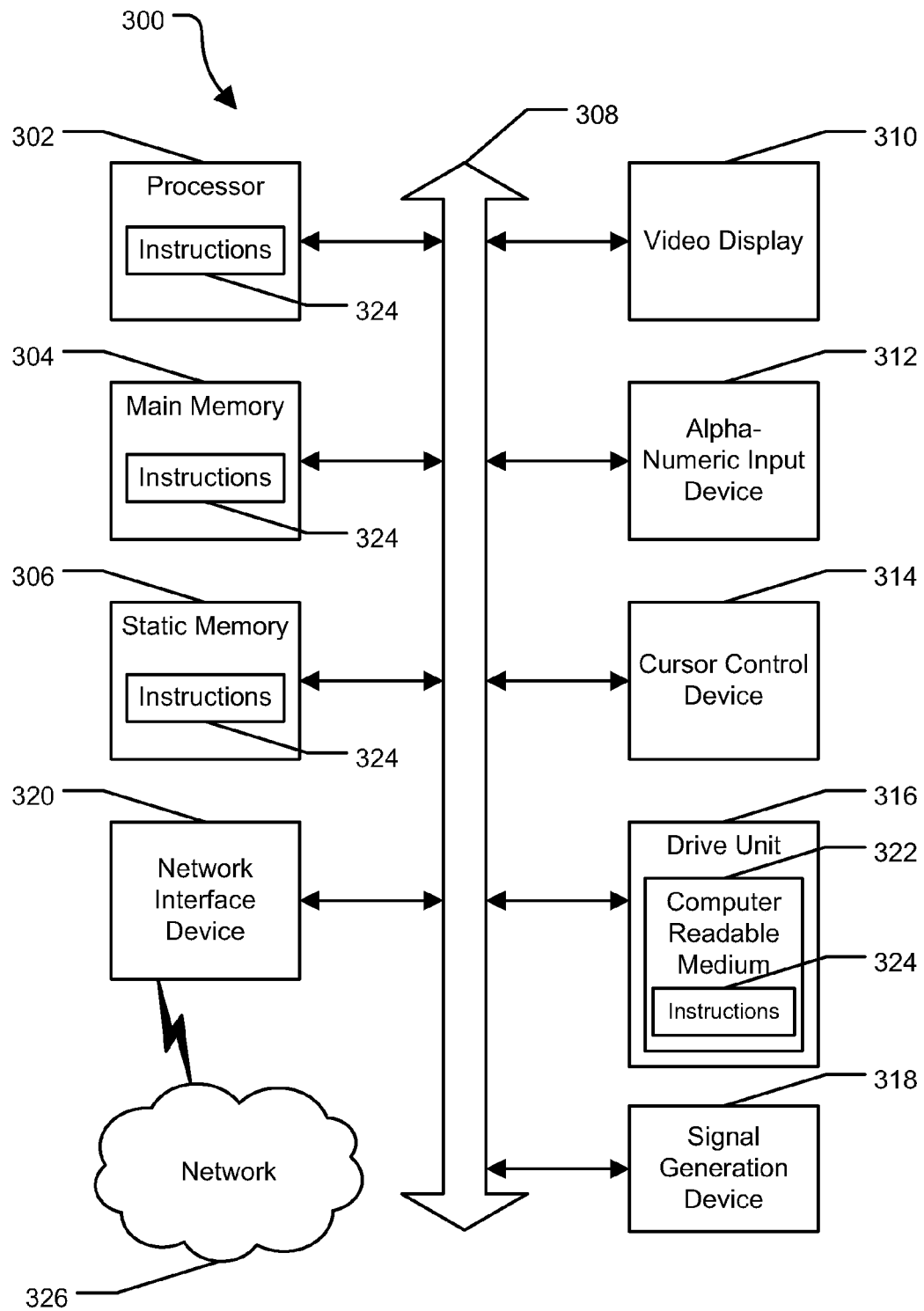
FIG. 4 is a block diagram showing an illustrative embodiment of a general computer system.

FIG. 4 shows an illustrative embodiment of a general computer system 300 in accordance with at least one embodiment of the present disclosure. Computer system 300 includes a set of instructions that can be executed to cause computer system 300 to perform any one or more of the methods or computer based functions disclosed herein. Computer system 300 can operate as a standalone device or can be connected via a network to other computer systems or peripheral devices.

In a networked deployment, computer system 300 operates in the capacity of a server or as a client computer in a server-client network environment, or as a peer computer system in a peer-to-peer (or distributed) network environment. Computer system 300 can also be implemented as or incorporated into various devices, such as a personal computer (PC), a tablet PC, a set-top box, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, computer system 300 is implemented using electronic devices that provide voice, video or data communication. Further, while computer system 300 is illustrated as a single system, the term "system" shall also be taken to include any collection of systems or sub-systems that individually or jointly execute a set, or multiple sets, of instructions to perform one or more computer functions.

Computer system 300 includes a processor 302 such as a central processing unit (CPU), a graphics processing unit (GPU), or both. Moreover, computer system 300 includes a main memory 304 and a static memory 306 that communicate with each other via a bus 308. Computer system 300 further includes a video display unit 310, such as a liquid crystal display (LCD), an organic light emitting diode (OLED), a flat panel display, a solid state display, or a cathode ray tube (CRT). Additionally, computer system 300 includes an input device 312, such as a keyboard, and a cursor control device 314, such as a mouse. Computer system 300 also includes a disk drive unit 316, a signal generation device 318, such as a speaker or remote control, and a network interface device 320.

In a particular embodiment, disk drive unit 316 includes a computer-readable medium 322 in which one or more sets of instructions 324 are embedded. Instructions 324 embody one or more of the methods or logic as described herein. In a particular embodiment, instructions 324 reside completely, or at least partially, within main memory 304, static memory 306, and/or within processor 302 during execution by computer system 300. Main memory 304 and processor 302 also include computer-readable media. Network interface device 320 provides connectivity to a network 326 such as a wide area network (WAN), a local area network (LAN), or other network. The present disclosure contemplates a computer-readable medium that includes instructions 324 or receives and executes instructions 324 responsive to a propagated signal, so that a device connected to network 326 can communicate voice, video or data over network 326. Further, instructions 324 can be transmitted or received by network 326 via network interface device 320.

In an alternative embodiment, dedicated hardware implementations such as application specific integrated circuits, programmable logic arrays and other hardware devices can be constructed to implement one or more of the methods described herein. Applications that include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein can be implemented by software code executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered a distribution medium that is equivalent to a tangible storage medium. Accordingly, the disclosure is considered to include any one or more of a computer-readable medium or a distribution medium and other equivalents and successor media, in which data or instructions can be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
    receiving, by a system comprising a host server having a processor, a first request from equipment of a first subscriber to use a network-based parental control service provided by a network, the network including a plurality of access routers each having a range of IP addresses associated therewith;
    assigning, by the system, a first IP address to a first access device in response to receiving the first request, the first access device comprising a residential gateway distinct from the equipment of the first subscriber, wherein the first IP address is selected from a first block of IP addresses that are reserved on the network for the network-based parental control service and not in the range associated with the access routers;
    receiving, by the system, a first transaction over the network from a source device, the first transaction having a first source IP address and a first destination IP address, the first transaction being destined for a destination device on the network having the first destination IP address;
    determining, by the system, whether either the first source IP address or the first destination IP address of the first transaction is included in the first block of IP addresses wherein the determining is based only on the first source IP address or the first destination IP address respectively;
    redirecting, by the system, the first transaction on a first network path to a parental control device on the network in response to determining that the first source IP address or the first destination IP address is included in the first block of IP addresses, the parental control device comprising a policy manager server distinct from the host server and coupled to an access router performing the redirecting,
        wherein a first address portion of the first source IP address corresponding to a range of IP addresses and not specific to the source device indicates whether the first source IP address is included in the first block of IP addresses,
        wherein a second address portion of the first destination IP address corresponding to a range of IP addresses and not specific to the destination device indicates whether the first destination IP address is included in the first block of IP addresses,
        wherein the parental control device routes the first transaction to the first destination IP address responsive to determining that the first transaction is permitted according to a parental control policy associated with the parental control service, the parental control policy comprising content filtering applied to the first transaction,
        wherein the parental control device prevents routing of the first transaction responsive to the parental control device determining that the first transaction is not permitted according to the parental control policy; and
    routing, by the system, the first transaction on a second network path distinct from the first network path to the first destination IP address responsive to determining that the first source IP address is not included in the first block of IP addresses.

2. The method of claim 1, further comprising:
    receiving a second transaction destined for the first access device;
    determining that a second destination IP address of the second transaction is included in the first block of IP addresses; and
    redirecting the second transaction to the parental control device in response to determining that the second destination IP address is included in the first block of IP addresses.

3. The method of claim 2, further comprising:
    receiving a second request from equipment of a second subscriber to not use the network-based parental control service provided by the network;
    assigning a second IP address to a second access device associated with the equipment of the second subscriber in response to receiving the second request, the second access device comprising a residential gateway for the second subscriber, wherein the second IP address is selected from a second block of IP addresses that are reserved on the network for users who have requested to not use the network-based parental control service;
    receiving a third transaction from the second access device;
    determining that a second source IP address of the third transaction is included in the second block of IP addresses; and
    routing the third transaction to a third destination IP address associated with the third transaction in response to determining that the second source IP address is included in the second block of IP addresses.

4. The method of claim 3, further comprising:
receiving a fourth transaction;
determining that a fourth destination IP address of the fourth transaction is included in the second block of IP addresses; and
routing the fourth transaction to the fourth destination IP address in response to determining that the fourth destination IP address is included in the second block of IP addresses.

5. The method of claim 2, wherein the parental control policy further comprises usage control and management applied to the first transaction, and the parental control device routes the first transaction to the first destination IP address in response to determining that the first transaction is allowed.

6. The method of claim 5, wherein the parental control device determines that the first transaction is not allowed based on the parental control policy, and prevents routing of the first transaction in response to determining that the first transaction is not allowed.

7. The method of claim 6, wherein the parental control device issues a third transaction from the parental control device that is destined to the first source IP address, and that indicates that routing of the first transaction was prevented in response to determining the first transaction is not allowed.

8. The method of redirecting IP traffic of claim 2, wherein the parental control device determines that the second transaction is allowed based on a content filter, and routes the second transaction to the second destination IP address in response to determining that the second transaction is allowed.

9. The method of claim 8, wherein the parental control device issues a third transaction from the parental control device that is destined to the first source IP address, and that indicates that routing of the second transaction was prevented.

10. A network-based parental control system, comprising:
a memory storing executable instructions; and
a processor coupled to the memory, which responsive to executing the instructions, performs operations comprising:
receiving, from a residential gateway of a system, a first transaction destined for a destination device on the network, the network including a plurality of access routers each having a range of IP addresses associated therewith, the first transaction including a first source IP address and a first destination IP address,
wherein the first transaction is redirected by the system on a first network path to the network-based parental control system, responsive to the system detecting the first source IP address in the first transaction having a first address portion associated with a first block of IP addresses reserved, in accordance with an address assignment performed by a host server, for parental control services provided by the network-based parental control system, or detecting that the first destination IP address has a second address portion associated with the first block of IP addresses, wherein IP addresses in the first block of IP addresses are not in the range associated with the access routers and are assigned to residential gateways distinct from equipment of network subscribers;
wherein the first address portion of the first source IP address corresponds to a range of IP addresses, is not specific to the residential gateway, and indicates whether the first source IP address is included in the first block of IP addresses,
wherein the second address portion of the first destination IP address corresponds to a range of IP addresses, is not specific to the destination device, and indicates whether the first destination IP address is included in the first block of IP addresses,
wherein the first transaction is routed on a second network path distinct from the first network path if not redirected;
determining, using a parental control policy comprising content filtering applied to the first transaction by a policy manager server distinct from the host server, whether the first transaction is allowed;
routing the first transaction to the first destination IP address responsive to determining the first transaction is allowed; and
preventing a routing of the first transaction responsive to determining the first transaction is not permitted.

11. The network-based parental control system of claim 10, wherein the determining comprises determining that the first transaction is allowed based on the content filtering.

12. The network-based parental control system of claim 10, wherein the determining comprises determining that the first transaction is not permitted based on the content filtering.

13. The network-based parental control system of claim 12, wherein the processor further performs operations comprising issuing a third transaction directed to the first source IP address that indicates that routing of the first transaction was prevented.

14. The network-based parental control system of claim 10, wherein the processor further performs operations comprising:
receiving from the system a second transaction including a second destination IP address;
determining whether the second transaction is allowed; and
routing the second transaction to the second destination IP address in response to determining that the second transaction is allowed.

15. A non-transitory machine-readable storage device, comprising executable code, which when executed by a processor of a host server, causes the processor to perform operations comprising:
receiving a first request from equipment of a first subscriber to use a network-based parental control service provided by a network, the network including a plurality of access routers each having a range of IP addresses associated therewith;
assigning a first IP address to a first access device in response to receiving the first request, the first access device comprising a residential gateway distinct from the equipment of the first subscriber, wherein the first IP address is selected from a first block of IP addresses that are reserved on the network for the network-based parental control service and not in the range associated with the access routers;
receiving a first transaction from the first access device, the first access device being a source of the first transaction, the first transaction having a first source IP address and a first destination IP address, the first transaction being destined for a destination device having the first destination IP address;
determining whether either the first source IP address or the first destination IP address of the first transaction is included in the first block of IP addresses, wherein the determining is based only on the first IP source address or the first IP destination address respectively;

redirecting the first transaction on a first network path to a parental control device on the network in response to determining that the first source IP address or the first destination IP address is included in the first block of IP addresses, the parental control device comprising a policy manager server distinct from the host server and coupled to an access router performing the redirecting, wherein a first address portion of the first source IP address corresponding to a range of IP addresses and not specific to the first access device indicates whether the first source IP address is included in the first block of IP addresses, wherein a second address portion of the first destination IP address corresponding to a range of IP addresses and not specific to the destination device indicates whether the first destination IP address is included in the first block of IP addresses, wherein the parental control device, using a parental control policy comprising content filtering applied to the first transaction, determines whether to route or block the first transaction;

routing the first transaction on a second network path distinct from the first network path to the first destination IP address in response to determining that the first source IP address is not included in the first block of IP addresses;

receiving a second transaction destined for the first access device;

determining that a second destination IP address of the second transaction is included in the first block of IP addresses; and redirecting the second transaction to the parental control device in response to determining that the second destination IP address is included in the first block of IP addresses.

16. The non-transitory machine-readable storage device of claim 15, wherein the operations further comprise:

receiving a second request from equipment of a second subscriber to not use the network-based parental control service provided by the network;

assigning a second IP address to a second access device associated with the equipment of the second subscriber in response to receiving the second request, the second access device comprising a residential gateway for the second subscriber, wherein the second IP address is selected from a second block of IP addresses that are reserved on the network for users who have requested to not use the network-based parental control service;

receiving a third transaction from the second access device;

determining that a second source IP address of the third transaction is included in the second block of IP addresses;

routing the third transaction to a third destination IP address associated with the third transaction in response to determining that the second source IP address is included in the second block of IP addresses;

receiving a fourth transaction;

determining that a fourth destination IP address of the fourth transaction is included in the second block of IP addresses; and routing the fourth transaction to the fourth destination IP address in response to determining that the fourth destination IP address is included in the second block of IP addresses.

17. The non-transitory machine-readable storage device of claim 15, wherein the parental control policy further comprises usage control and management applied to the first transaction.

18. The non-transitory machine-readable storage device of claim 17, wherein the parental control device issues a fifth transaction destined to the first source IP address that indicates that routing of the first transaction was prevented.

19. The non-transitory machine-readable storage device of claim 17, wherein the parental control device performs operations comprising:

determining that the first transaction is allowed based on the content filtering; and routing the first transaction to the first destination IP address in response to determining that the second transaction is allowed.

20. The non-transitory machine-readable storage device of claim 17, wherein the parental control device performs operations comprising:

determining that the first transaction is not allowed based on the content filtering;

preventing the routing of the first transaction in response to determining that the first transaction is not allowed; and issuing a fifth transaction that is destined to the first source IP address, and that indicates that routing of the first transaction was prevented.

* * * * *